United States Patent [19]
Bose

[11] 3,914,549
[45] Oct. 21, 1975

[54] ELECTRICAL AUDIO SIGNAL PROCESSING

[75] Inventor: Amar G. Bose, Chestnut Hill, Mass.

[73] Assignee: Bose Corporation, Framingham, Mass.

[22] Filed: Mar. 13, 1972

[21] Appl. No.: 234,042

Related U.S. Application Data

[63] Continuation of Ser. No. 782,693, Dec. 10, 1968, abandoned, which is a continuation-in-part of Ser. No. 690,695, Dec. 4, 1967, Pat. No. 3,582,553.

[52] U.S. Cl. .............................................. 179/1 G
[51] Int. Cl.[2] ........................................... H04R 5/04
[58] Field of Search .......... 179/100.2 B, 1 SW, 1 A, 179/1 G

[56] References Cited

UNITED STATES PATENTS 3,443,038 5/1969 Mergner ...................... 179/100.2 B

OTHER PUBLICATIONS

A Stereo Control Unit, pp. 43 and 120 of Radio and TV News, Aug. 1958.

*Primary Examiner*—Kathleen H. Claffy
*Attorney, Agent, or Firm*—Jerry Cohen; Charles Hieken

[57] ABSTRACT

An electronic loudspeaker equalizer network is coupled to the tape monitor jacks of a receiver, preamplifier-amplifier or preamplifier. When the receiver, preamplifier-amplifier or preamplifier has the tape monitor switch positioned in the IN position to select the tape monitoring function, the electronic equalizer network electronically equalizes the overall frequency response so that the radiated power spectrum of the loudspeaker connected to an associated amplifier is substantially flat over the audio frequency range. The electronic equalizer also includes a tape monitor switch and tape monitor jacks so that a tape recorder may be connected to the electronic equalizer and the recorded signal monitored with the equalizer tape monitor switch in the IN or MONITOR position, the latter signal first passing through the electronic equalizing network.

5 Claims, 2 Drawing Figures

INVENTOR.
AMAR G. BOSE
BY
Wolf, Greenfield & Hieken

ELECTRICAL AUDIO SIGNAL PROCESSING

This is a continuation of application Ser. No. 782,693 filed Dec. 10, 1968, now abandoned, which was a continuation-in-part of application Ser. No. 690,695 filed Dec. 4, 1967, now U.S. Pat. No. 3,582,553 granted June 1, 1971.

BACKGROUND OF THE INVENTION

This application is a continuation-in-part of application Ser. No. 690,695 filed Dec. 4, 1967 of Amar G. Bose entitled LOUDSPEAKER SYSTEM, now U.S. Pat. No. 3,582,553.

The present invention relates in general to processing audio signals and more particularly concerns novel methods and means for processing audio signals at low level with an external network that may be conveniently connected to existing tape monitor jacks of most high fidelity amplification systems while still making available the tape monitor function. More particularly, the invention provides a convenient means for electronically equalizing the radiated frequency response of a loudspeaker system.

It is an important object of this invention to provide methods and means for conveniently introducing external audio signal processing to most commercially available high fidelity equipment.

It is a further object of the invention to achieve the preceding object with conveniently available tape monitor jacks.

It is still another object of the invention to achieve the preceding objects while conveniently retaining the tape monitor function.

It is still a further object of the invention to achieve the preceding objects while processing a recorded signal from a tape recorder.

It is another object of the invention to achieve one or more of the preceding objects while coacting with an external loudspeaker system to electronically equalize the loudspeaker system so that its radiated power spectrum is substantially uniform over the audio frequency range.

SUMMARY OF THE INVENTION

According to the invention, there is audio signal processing means having an input terminal means for receiving a signal from a tape monitor first terminal means that is normally arranged for coupling to the input of a tape recorder. The audio signal processing circuit means also includes output terminal means for delivering a signal to the tape monitor output terminal means normally arranged for being coupled to the output of a tape recorder. The audio signal processing circuit means also includes tape recorder input terminal means for coupling to the input of a tape recorder and tape recorder output terminal means for coupling to the output of a tape recorder, and tape monitor switching means for selectively coupling the audio signal processing input terminal means to the input of the audio signal processing circuit means through the tape recorder input terminal means and tape recorder output terminal means to effect the tape monitoring function from the audio signal processing circuit means with the recorded output signal of the tape recorder being processed thereby.

Numerous other features, objects and advantages of the invention will become apparent from the following specification when read in connection with the accompanying drawing in which:

DETAILED DESCRIPTION OF PREFERRED EMBODIMENTS

Figure 1:
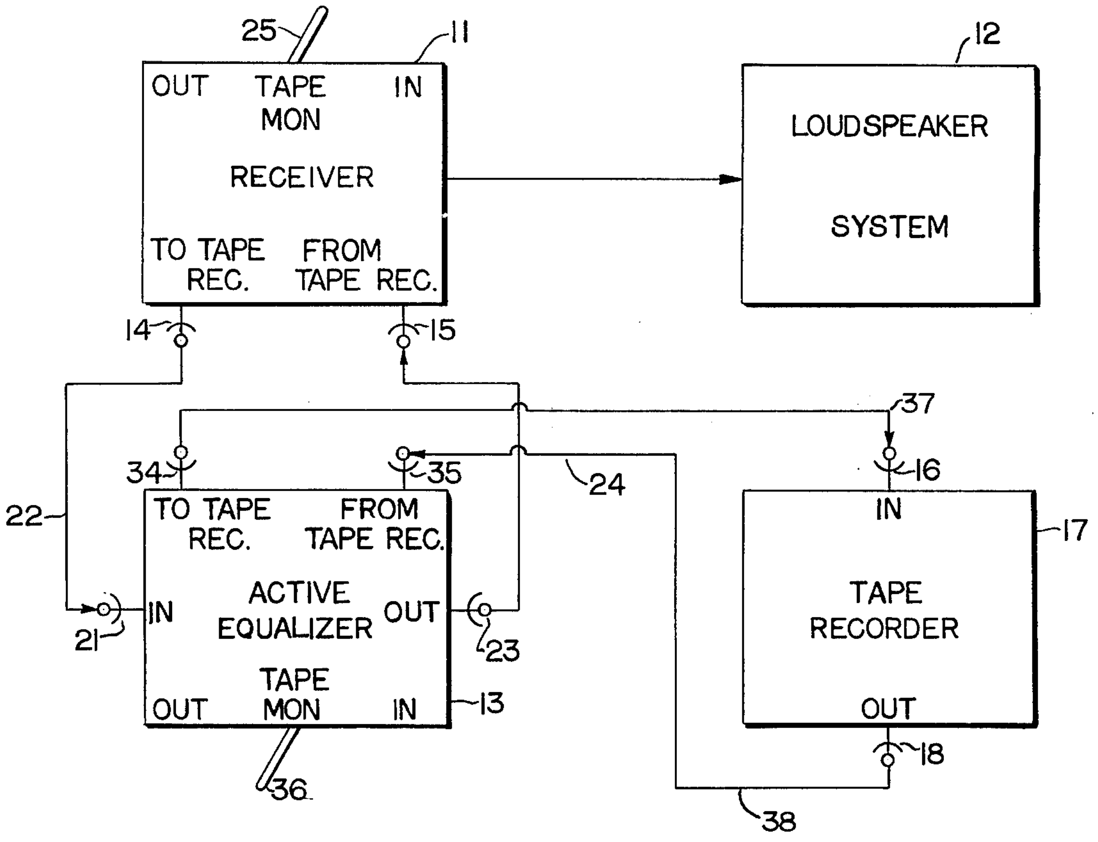
FIG. 1 is a block diagram illustrating the logical arrangement of a system according to the invention.

With reference now to the drawing and more particularly FIG. 1 thereof, there is shown a block diagram generally illustrating the logical arrangement of a system according to the invention. The receiver 11 drives a speaker system 12, preferably the BOSE 901 speaker system having an active equalizer 13. The BOSE 901 system is commercially available and comprises two speaker enclosures, one for each stereo channel and an active equalizer with circuit means for processing the signals in the left channel and the right channel in parallel. To avoid obscuring the principles of the invention, the interconnections for only a single channel are shown and described in this application. However, it will be evident to those skilled in the art that stereo involves nothing more than duplicating the illustrated structure for a single channel by adding additional input and output jacks, an additional terminal pair for connecting a second speaker enclosure and another pole for the tape monitor switch.

Most presently made receivers, preamplifier-amplifiers and preamplifiers have means for selecting a tape monitor function that allows the operator to record material from a program source while listening to that material immediately after being recorded upon recording tape in an attached tape recorder.

To this end receiver 11 includes a tape recorder input jack 14 and a tape recorder output jack 15 normally connected to the tape recorder input jack, such as 16 of tape recorder 17 and the tape recorder output jack 18, respectively. Applicant has discovered that the jacks 14 and 15 comprise an especially convenient means for introducing audio electrical signal processing circuit means for the purpose, for example, of equalizing the acoustical output of speaker 12 so that the radiated power spectrum is substantially flat over the audio frequency range. To this end the input jack 21 of active equalizer 13 is coupled to the receiver to tape recorder jack 14 of receiver 11 by input cable 22 having standard phono connectors on each end. Output jack 23 of active equalizer 13 is connected to the receiver from tape recorder jack 15 by output cable 24 having standard phone plugs on each end. With tape monitor switch 25 of receiver 11 in the IN position as indicated, active equalizer 13 is connected between relatively low level stages of receiver 11 to alter the frequency response characteristics of receiver 11 so that the acoustical energy radiated by speaker 12 is characterized by a power spectrum that is substantially flat over the audio frequency range.

A feature of the invention is that the tape monitoring function is still retained by including the active equalizer to tape recorder jack 34 and from tape recorder jack 35 on active equalizer 13 together with the active equalizer tape monitor switch 36. To tape recorder jack 34 is coupled to in jack 16 of tape recorder 17 by cable 37 having two conventional phono plugs on each end. From tape recorder jack 35 is coupled to output jack 18 of tape recorder 17 by cable 38 having two phono jacks on each end. With switch 36 in the IN position active equalization is applied to the recorded output signal provided by tape recorder output jack 18. Thus, one monitoring a tape recording hears it as it would be reproduced by a nearly perfect acoustical transducing system.

Figure 2:
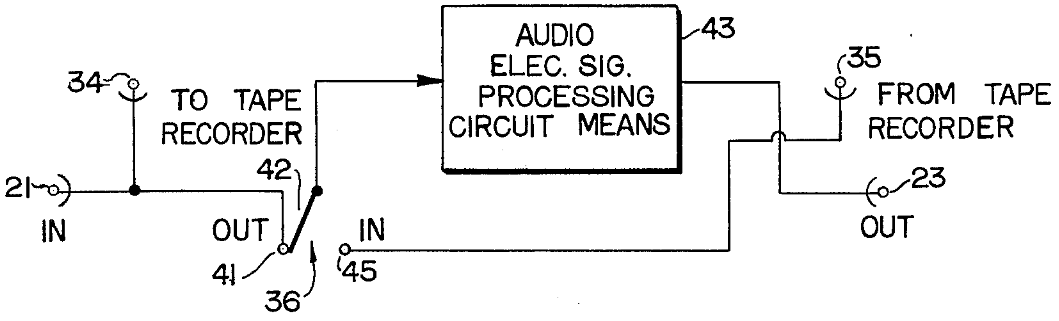
FIG. 2 is a combined block-schematic circuit diagram illustrating a preferred switching and jack arrangement for a stereo system.

Referring to FIG. 2, there is shown a conbined block-schematic circuit diagram of an exemplary arrangement for selectively interconnecting the different jacks to effect the tape monitor function. Corresponding elements are identified by the same reference symbol throughout the drawing. Active equalizer in jack 21 and active equalizer to tape recorder jack 34 are connected in parallel and the ungrounded terminal of each of these jacks is connected to out terminal 41 of tape monitor switch 36. The arm 42 of tape monitor switch 36 is connected to the input of the audio electrical signal processing circuit means 43 that typically is characterized by a frequency response characteristic for coacting with speaker 12 to provide an acoustical output characterized by a radiated power spectrum that is substantially uniform over the audio frequency range. Alternately, this circuit means 42 might perform some other or additional functions, such as reducing impulse noise or providing a desired degree of signal compression or expansion. The output of audio electrical signal processing circuit means 43 is connected to active equalizer output jack 23. The remaining IN terminal 45 of active equalizer tape monitor switch 36 is connected to the ungrounded terminal of active equalizer from tape recorder jack 35.

To select the tape monitor function, arm 42 is switched to establish contact with IN terminal 45 and thereby deliver the recorded signal received at jack 35 to the input of audio electrical signal processing circuit means 43. For stereo operation, switch 36 is preferably a double-pole double-throw switch instead of the single-pole double-throw switch illustrated with each of the elements in FIG. 2 being duplicated for the other channel.

There has been described a novel electrical signal processing circuit means capable of being easily inserted into most commercially available high fidelity amplification equipment now being made while retaining the desired monitor function. It is evident that those skilled in the art may now make numerous modifications and uses of and departures from the specific embodiments described herein without departing from the inventive concepts. For example, instead of connecting tape recorder 17 as indicated in FIG. 2, one might connect another signal processing circuit generally of the type of that shown in FIG. 1 and connect tape recorder 17 to the second such processing circuit having jacks like 34 and 35 and a switch like 36, or for that matter, virtually any number of such boxes to achieve such additional functions as noise reduction and/or compression without departing from the principles of the invention. Accordingly, the invention is to be construed as embracing each and every novel feature and novel combination of features present in or possessed by the apparatus and techniques herein disclosed and limited solely by the spirit and scope of the appended claims.

What is claimed is:

1. Apparatus for association with but separately packaged from audio signal amplifying means having a tape monitor switch for selecting a tape monitor function, a "to tape recorder" terminal means and a "from tape recorder" terminal means, said apparatus comprising, active audio electrical signal processing circuit means having an input and an output for providing equalization of an input signal over at least a portion of the audio frequency range, input terminal means for coupling to the "to tape recorder" terminal means, output terminal means for coupling to the "from tape recorder" terminal means and coupled to said circuit means output, additional "to tape recorder" terminal means for coupling to the input of a tape recorder and coupled to said input terminal means, additional "from tape recorder" terminal means for coupling to the output of a tape recorder, and additional tape monitor switching means for selectively coupling said circuit means input to said input terminal means when the additional tape monitor function is out and to said additional "from tape recorder" terminal means when the additional tape monitor function is in, whereby when the additional tape monitor function is out said additional tape monitor switching means comprises means coupling both said input terminal means and said additional "to tape recorder" terminal means to said audio electrical signal processing circuit means input while then keeping said additional "from tape recorder" terminal means disconnected therefrom and when the additional tape monitor function is in said additional tape monitor switching means comprises means coupling said additional "from tape recorder" terminal means to said audio electrical signal processing circuit means input while keeping both said additional "to tape recorder" terminal means and said input terminal means disconnected therefrom.

2. Apparatus in accordance with claim 1 and further comprising, said audio signal amplifying means and means for coupling said "to tape recorder" terminal means to said input terminal means and means for coupling said output terminal means to said "from tape recorder" terminal means, and tape recorder means having an input coupled to said additional "to tape recorder" terminal means and an output coupled to said additional "from tape recorder" terminal means.

3. Apparatus in accordance with claim 2 and further comprising a loudspeaker system coupled to said audio signal amplifying means, said audio electrical signal processing circuit means comprising active equalizing means for coacting with said loudspeaker system to establish a radiated power spectrum of said loudspeaker system that is substantially flat over the audible frequency range.

4. Apparatus for association with but separately packaged from audio signal amplifying means having a tape monitor switch for selecting a tape monitor function in accordance with claim 1 wherein each of said "to tape recorder" terminal means, said "from tape recorder" terminal means, said input terminal means and said output terminal means comprises standard phono connectors.

5. Apparatus for association with but separately packaged from audio signal amplifying means having a tape monitor switch for selecting a tape monitor function in accordance with claim 4 wherein each of said standard phono connectors is a jack for receiving a standard phono plug.

* * * * *